Figure 1:
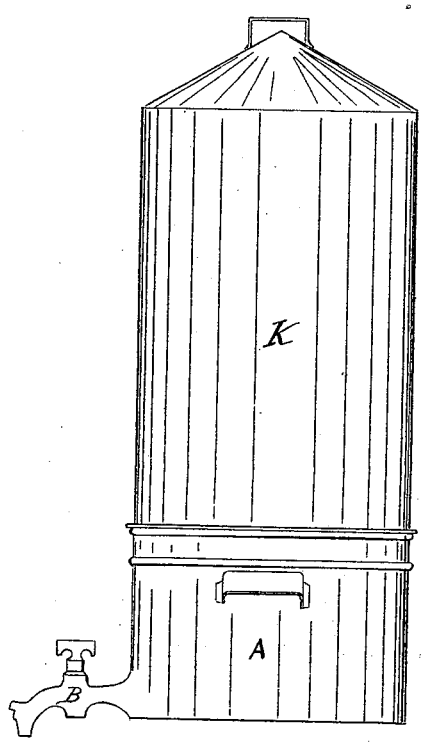
Figure 2:
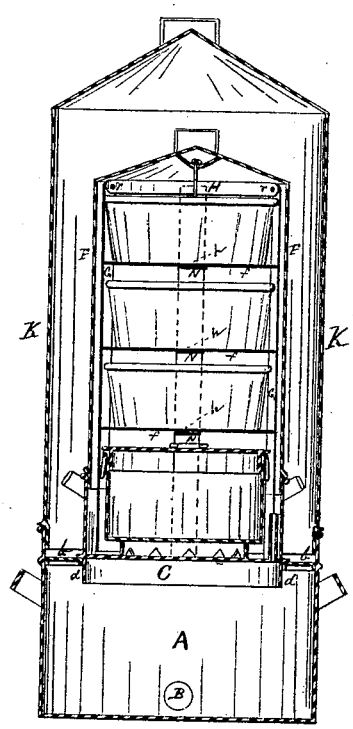
Figure 3:
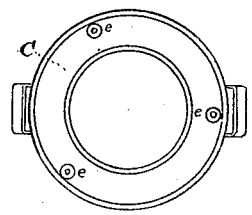
Figure 4:
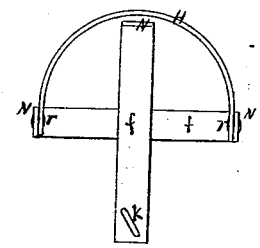

S. T. GOODWYN.
Steam Culinary-Vessel.

No. 159,755.  Patented Feb. 16, 1875.

Witnesses
Benjamin C Pole
J. Tyler Powell

Inventor
S. T. Goodwyn
Per
Jno. W. Frazer
Atty

THE GRAPHIC CO.PHOTO-LITH.39 & 41 PARK PLACE,N.Y.

UNITED STATES PATENT OFFICE.

SIMEON T. GOODWYN, OF NEW ORLEANS, LOUISIANA, ASSIGNOR TO VIRGINIA H. GOODWYN.

IMPROVEMENT IN STEAM CULINARY VESSELS.

Specification forming part of Letters Patent No. 159,755, dated February 16, 1875; application filed July 1, 1874.

*To all whom it may concern:*

Be it known that I, SIMEON T. GOODWYN, of the city of New Orleans, in the parish of Orleans, in the State of Louisiana, have invented a new and useful Improvement in Steam-Cookers, of which the following is a specification:

The object of my invention is to increase the efficiency of the cooker, and to effect a saving in the use of fuel; also, to provide for cleaning the boiler readily of sediment, and thereby prevent decay from rust, which would result from continued use without cleaning.

A prominent feature in my invention is the use of an additional cylinder, which incloses the cooker, and retains the heat, which otherwise would rapidly dissipate, and thereby secures greater economy both in time and fuel required for cooking; and I do hereby declare that the following is a full and exact description of the same, reference being had to the accompanying drawings and letters marked thereon, in which—

Figure I is a longitudinal upright view, embodying my invention; and Fig. II is a sectional view of the same, showing the arrangement of the parts; and Fig. III is a top view of the receptacle C, having tubular openings *e e e;* and Fig. IV is a top view of the rack G, showing the arrangement of the cross-pieces *f f f* and handle H.

A represents a boiler having a flat bottom, so as to admit of its use on a stove or furnace. B is a faucet. This boiler is open at the top, and has a flange, *b*, on the inner side near the top, which serves as a support for the receptacle C. The receptacle C forms a base for the support of the cooker F and rack G. (See Fig. II.) The auxiliary cylinder K fits into, and rests on, the rim of the boiler. The receptacle has three tubular openings for the passage of heated steam, as shown in Fig. III. The rack G is composed of uprights N N N, cross-pieces *f f f*, handle H, and rod K. (See Figs. II and IV.) Resting on the receptacle C, under the rack G, is a covered dish for meats. Covered or uncovered dishes may be placed in the receptacle in the rack.

The cylinder K excludes the atmosphere from contact with the cooker F, and produces a more powerful as well as a more uniform degree of heat, facilitating the process of cooking, and economizing fuel.

The parts of my invention can be adapted to, and used on, any boiler, pot, or kettle, such as are ordinarily used, if desired.

Having thus fully described my invention, what I claim is—

1. The receptacle C, which has a projecting edge, *d*, and tubular openings *e e e*, in combination with the cooker F, as and for the purpose described.

2. The boiler A, receptacle C, cooker F, having rack G and cylinder K, all constructed, arranged, and combined substantially as and for the purpose described.

S. T. GOODWYN.

Witnesses:
 ANDREW HERO, Jr.,
 P. A. CONANT.